US008608614B2

(12) United States Patent
Fuchs et al.

(10) Patent No.: US 8,608,614 B2
(45) Date of Patent: Dec. 17, 2013

(54) ACTUATION SYSTEM FOR A DRIVE UNIT OF A MOTOR VEHICLE (75) Inventors: Detlef Fuchs, Ludwigsburg (DE);
Lothar Rehm, Herrenberg (DE);
Thomas Von Raumer, Stuttgart (DE)

(73) Assignee: Daimler AG, Stuttgart (DE)

( * ) Notice: Subject to any disclaimer, the term of this patent is extended or adjusted under 35 U.S.C. 154(b) by 866 days.

(21) Appl. No.: 12/376,721

(22) PCT Filed: Aug. 6, 2007

(86) PCT No.: PCT/EP2007/006926
§ 371 (c)(1),
(2), (4) Date: May 5, 2010

(87) PCT Pub. No.: WO2008/017438
PCT Pub. Date: Feb. 14, 2008

(65) Prior Publication Data
US 2010/0217463 A1 Aug. 26, 2010

(30) Foreign Application Priority Data
Aug. 9, 2006 (DE) .......................... 10 2006 037 124

(51) Int. Cl.
*B60K 1/02* (2006.01)
*H02P 1/00* (2006.01)
*H02P 3/00* (2006.01)
*H02P 7/00* (2006.01)

(52) U.S. Cl.
USPC .................................................. 477/3; 477/7

(58) Field of Classification Search
USPC ............... 477/3, 7; 701/22; 180/65.1, 65.275, 180/65.28, 65.285, 65.8
See application file for complete search history.

(56) References Cited

U.S. PATENT DOCUMENTS

| 5,880,568 A | 3/1999 | Bederna et al. |
| 6,490,511 B1 | 12/2002 | Raftari et al. |
| 6,588,256 B2 * | 7/2003 | Gassner et al. ............ 73/114.15 |
| 6,862,511 B1 | 3/2005 | Phillips et al. |
| 6,879,891 B1 | 4/2005 | Bederna |
| 6,918,064 B2 * | 7/2005 | Mueller et al. .................. 714/43 |
| 2008/0278869 A1 | 11/2008 | Rehm et al. |

FOREIGN PATENT DOCUMENTS

| DE | 44 38 714 A1 | 5/1996 |
| DE | 199 17 208 A1 | 10/2000 |
| DE | 102 51 095 A1 | 5/2004 |
| DE | 10 2005 025 994 A1 | 1/2007 |
| DE | 10 2005 040 778 A1 | 3/2007 |
| DE | 10 2005 048 330 A1 | 4/2007 |

OTHER PUBLICATIONS

International Search Report including English translation of relevant portion dated Nov. 16, 2007 (Thirteen (13) pages).

* cited by examiner

*Primary Examiner* — Tisha Lewis
(74) *Attorney, Agent, or Firm* — Crowell & Moring LLP (57) ABSTRACT An actuation system for a drive unit of a motor vehicle includes a control unit which is assigned to the drive unit and which has a function level, a function monitoring level, and having a power output stage for actuating the drive unit or actuators or sensors which are assigned to the drive unit. To relieve the function a data transmission device for outputting data to a data bus is arranged in the function monitoring level. The data transmission device can output a drive setpoint torque to the drive unit, to actuators or sensors which are assigned to it, or to a power output stage (9, 9') of a separate, second drive unit.

11 Claims, 4 Drawing Sheets

ACTUATION SYSTEM FOR A DRIVE UNIT OF A MOTOR VEHICLE

This application is a continuation of PCT International Application No. PCT/EP2007/006926, filed Aug. 6, 2007, which claims priority under 35 U.S.C. §119 to German Patent Application No. 10 2006 037 124.0, filed Aug. 9, 2006, the entire disclosure of which is herein expressly incorporated by reference.

BACKGROUND AND SUMMARY OF THE INVENTION

The invention relates to an actuation system for a drive unit of a motor vehicle German patent document DE 10 2005 048 330, which is currently unpublished, discloses an actuation system for an electric machine, having a function level and a monitoring level which is independent of the function level. The function level has a device for converting one or more incoming operating parameter values of the electric machine into an output value. An actual torque is output as an output value via the function monitoring level.

German patent document DE 102 51 095 A1, on the other hand, discloses a method for operating an electric machine having an actuation system. An operating variable of the electric machine or of the actuation system is monitored, and the acceptability of an actual torque of the electric machine is checked. When the actual torque is not acceptable, a fault reaction is initiated. The acceptability of the actual torque is preferably checked by forming an acceptable torque from a setpoint torque and predefined limiting values for the setpoint torque. The actual torque is acceptable if its deviation from the acceptable torque does not exceed a specific absolute value. The invention can be used to monitor an electric machine which is employed as a starter/generator in a motor vehicle.

The control units of an actuation system of a drive unit are generally monitored on three levels. Such a monitoring concept is disclosed, for example, in German patent document DE 44 38 714 A1, which describes a method and apparatus for controlling the drive power of a vehicle having a microcomputer with at least two different levels. A first level carries out the control functions, while a second level performs the monitoring functions. A third level forms a supervision level which supervises the monitoring level and thus the microcomputer.

One object of the present invention is to provide an actuation system with a high level of data security, as well as a good reaction speed and availability level.

This and other objects and advantages are achieved by the method and apparatus according to the invention, in which a data transmission device for outputting data to a data bus is arranged in the function monitoring level. The data transmission device can output a drive setpoint torque to the drive unit, to actuators or sensors which are assigned to it or to a power output stage of a second drive unit.

By arranging a data transmission device for outputting data in the function monitoring level, the data can be subjected to quality checking by the function monitoring level, before they are output. For example, the data can be checked for up-to-dateness, acceptability, plausibility, correctness of an accompanying check number and the like. Likewise, this permits unacceptable data to be replaced by acceptable data, thereby increasing the data security and the quality of the data which is output. Carrying out these processes which require computer capacity and are time consuming in the function monitoring level speeds up the processes in the function level. At the same time, the desired quality of the data transmission is maintained since supervision processes and check processes which are relevant to quality are not omitted, rather, they are simply exported into the function monitoring level.

In one embodiment, a predefined setpoint value can be fed to the control unit and split in the function level of the control unit into a plurality of drive setpoint torques. Each drive setpoint torque is assigned to a separate drive unit, so that it is possible to coordinate a plurality of drive units with one another. With this embodiment, the failure of one drive unit can easily be compensated by the other drive units.

In another embodiment, the control unit has a torque limiter by which the drive setpoint torque which is fed to it can be limited if a comparator detects that the sum of the drive setpoint torques exceeds a maximum acceptable torque. This ensures that a fault has not occurred when the torque request was split and that the sum of all the torques also corresponds to the desired overall torque.

In still another embodiment, the data transmission device of the function monitoring level of the control unit which is assigned to a drive unit can output a setpoint axial torque to a hybrid control unit. As a result, it is possible to form a distributed system in which the control of the actuators occurs locally with respect to the actuators (because, for example, the power electronics including the control means are arranged directly on the machine). In this case, there is no need for cables for the machine, but instead it is also possible to use power rail arrangements. The power rail arrangements here are rigid conductor tracks which are cost effective to manufacture and robust against heat, moisture, dirt and mechanical loading.

In yet another embodiment, a hybrid control unit is provided in which drive setpoint torques for the separate drive units that are to be actuated can be formed from a requested axial setpoint torque. The drive setpoint torques can be forwarded from the hybrid control unit to the control units of the drive units which are to be actuated. This embodiment has the advantage that a separate hybrid control unit is provided to coordinate all the drive units. The control unit of the internal combustion engine is therefore relieved of these functions and decoupled from the associated risk of faults. Different drive units, for example even a plurality of internal combustion engines, can therefore be coupled to a hybrid control unit. If a fault occurs in the hybrid control unit, it is possible to deactivate the hybrid control unit and operate the internal combustion engine solely by means of its own control unit. This increases the availability level of the entire motor vehicle system.

In another embodiment, the control units of the drive units which are to be actuated are connected to the hybrid control unit in such a way that the respective actual torques of the separate drive units can be forwarded from the control units of the drive units to the hybrid control unit. It is therefore possible for the hybrid control unit to monitor the satisfactory implementation of the specified tasks, and if appropriate, to intervene in a controlling fashion.

In a further embodiment, an acceptable torque can be formed in the function monitoring level of the control unit and increased by a tolerance T. This toleranced acceptable torque can be compared in a second torque comparator with a sum which can be formed by adding the respective actual torques or the actual axial torques of the separate drive units, and a remedial measure can be triggered by the second torque comparator if this sum exceeds the toleranced acceptable torque. As a result, it is possible to detect a fault in the composite actual torque, and to initiate measures for fault correction. Monitoring the composite actual torque improves the fault detection. This only requires monitoring of the composite torque since it influences the reaction of the vehicle to undesired positive or negative acceleration. However, it is not necessary to monitor the distribution of the individual torques. Initiating the remedial measures ensures that there is no undesired reaction of the vehicle, for example due to excessive torque or an excessively high braking torque. Since it continues to be possible to use the system even as a result of these measures, the availability level of the drive units and of the entire system increases.

In still a further embodiment, a supervision unit which supervises the function level and/or the function monitoring level of the hybrid control unit is assigned to the hybrid control unit. The supervision unit is directly connected to the data transmission device via a deactivation path, and the data transmission device can be deactivated if the supervision unit detects a fault of the hybrid control unit. The use of a three level monitoring concept improves the quality of the data and enhances the detection of faults.

In yet another embodiment, the supervision unit is directly connected to a power output stage of one of the control units via a deactivation path, and the power output stage can be deactivated if the supervision unit detects a fault of the control unit. It is therefore possible, for example, to deactivate the power output stages of electric drive units or actuators of an internal combustion engine if a supervision unit of a hybrid control unit detects a fault of the hybrid control unit. It is also possible to avoid potential damage to the drive units due to incorrect actuation.

In one embodiment, the supervision unit is directly connected to the hybrid control unit via a reset path, and the hybrid control unit can be reset into a standard state if the supervision unit detects a fault of the hybrid control unit. As a result, in the event of a fault the actuation system can be returned to a defined state. This increases the availability level of the system.

Other objects, advantages and novel features of the present invention will become apparent from the following detailed description of the invention when considered in conjunction with the accompanying drawings.

DETAILED DESCRIPTION OF THE DRAWINGS

All the devices and other components of the control unit which are illustrated in FIG. 1 to FIG. 4 can equally well be embodied as electronic components, as a functionality or as a memory area of a computer module, as software or the like.

Figure 1:
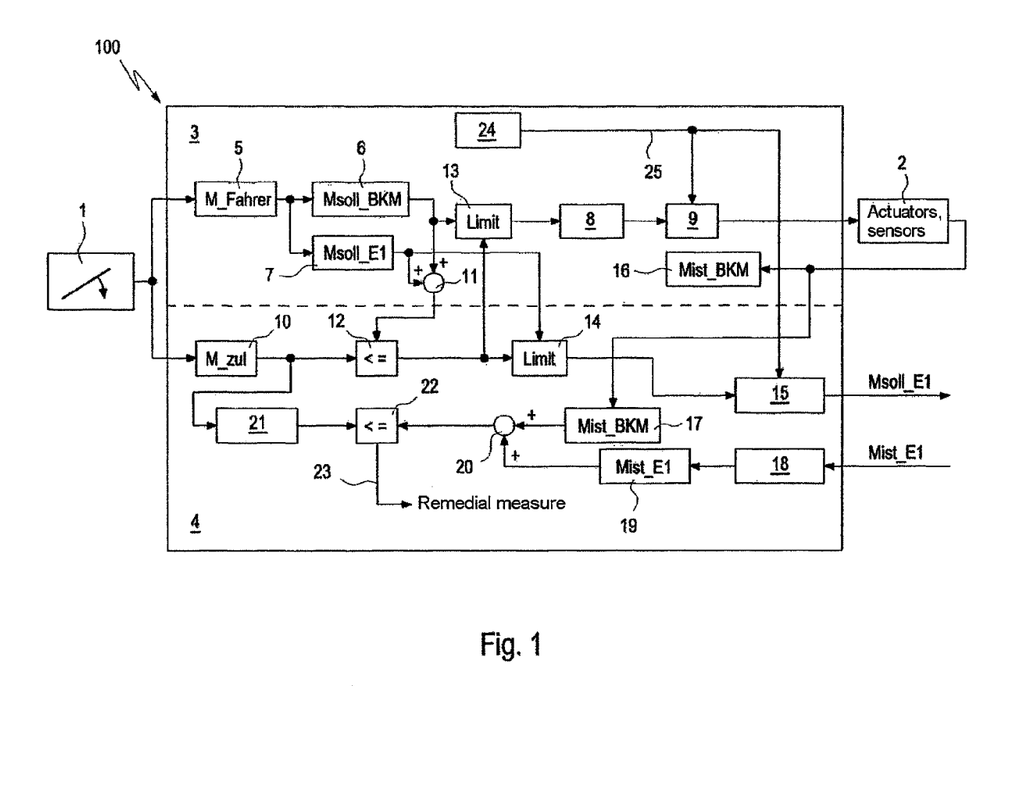
FIG. 1 is a schematic illustration of an embodiment of an actuation system according to the invention, having a control unit for an internal combustion engine and an electric machine.

FIG. 1 shows an actuation system having a control unit 100 for an internal combustion engine and an electric machine. This control unit 100 has a function level 3 and a function monitoring level 4. It receives information from an accelerator pedal 1 about the position of the accelerator pedal and, based thereon, control instructions for actuators and/or sensors 2 of an internal combustion engine, and a setpoint torque for an electric machine.

The accelerator pedal 1 transmits information about the position of the accelerator pedal to the function level 3 of the control unit 100, and the latter forms therefrom a driver request torque M_Fahrer in a device 5. The driver request torque M_Fahrer is forwarded by the device 5 to a device 6 and a device 7. In the device 6, a setpoint torque Msoll_BKM of the internal combustion engine is formed from the driver request torque M_Fahrer. A setpoint torque Msoll_E1 of an electric machine is formed in the device 7 from the driver request torque M_Fahrer. Here, the devices 6 and 7 can also be integrated into the device 5. The setpoint torque Msoll_BKM, formed in the device 7, of the internal combustion engine is, if appropriate after limitation by a limiter 13, forwarded to a torque conversion means 8. The torque conversion means 8 converts the setpoint torque Msoll_BKM of the internal combustion engine into control instructions for a power output stage 9. The power output stage 9 assumes the state predefined by the control instructions of the torque conversion means 8, and in this way operates the actuators and/or sensors 2 assigned to it, in accordance with the control instructions predefined by the torque conversion means 8.

The accelerator pedal 1 transmits the information about the position of the accelerator pedal to the function monitoring level 4 of the control unit 1, and the latter forms therefrom a maximum acceptable torque M_zul in a device 10. The device 10 forwards the maximum acceptable torque M_zul to a comparator 12 and a device 21.

In the comparator 12, the acceptable torque M_zul is compared with the sum of the setpoint torques of all the drive units, which is formed in a device 11. For this purpose, the setpoint torque Msoll_BKM of the internal combustion engine is added to the setpoint torque Msoll_E1 of the electric machine in the device 11, and the result is fed to the comparator 12, which checks whether the sum of the setpoint torques which is formed in device 11 is less than or equal to the maximum acceptable torque M_zul formed in the device 10. If not, the comparator 12 forwards this information to limiters 13 and 14.

The limiter 13 is arranged in the function level 3 between the device 6 and the torque conversion means 8, and limits, to an acceptable degree, the setpoint torque Msoll_BKM, formed in device 6, of the internal combustion engine before said setpoint torque Msoll_BKM is fed to the torque conversion means 8.

The limiter 14 is arranged in the function monitoring level 4. If the sum of the setpoint torques which is formed in device 11 is less than or equal to the maximum acceptable torque M_zul which is formed in the device 10, the limiter 14 forwards, without modification, the setpoint torque Msoll_E1, formed in the device 7, of the electric machine to a data bus output 15. If the sum of the setpoint torques which is formed in the device 11 is not less than or equal to the maximum acceptable torque M_zul which is formed in device 10, the limiter 14 limits the setpoint torque Msoll_E1, formed in device 7, of the electric machine to an acceptable degree before the setpoint torque Msoll_E1 is fed to the data bus output 15.

In the device 21, the acceptable torque M_zul is increased by a tolerance value, and the result. M_zul_T is then fed to a comparator 22.

Information about the actual state of the internal combustion engine is fed back to the control unit 100 from the actuators and/or sensors 2 of the internal combustion engine.

In the embodiment illustrated in FIG. 1, this information is fed to the device 16 of the function level 3 and to the device 17 of the function monitoring level 4.

A current actual torque Mist_BKM of the internal combustion engine is formed in the device 16 from the information about the actual state of the internal combustion engine. Similarly, a current actual torque Mist_BKM of the internal combustion engine is also formed in the device 17 from the information about the actual state of the internal combustion engine. The device 17 then feeds the actual torque Mist_BKM of the internal combustion engine to a device 20.

In addition to the information about the actual state of the internal combustion engine, information about the actual state of the electric machine E1 is also fed back to the control unit 100. For this purpose, in the embodiment illustrated in FIG. 1 information about the current actual torque Mist_E1 of the electric machine is fed back to a data bus input 18 of the function monitoring level 4. The data bus input 18 forwards this information to a device 19, which then feeds the actual torque Mist_BKM of the internal combustion engine to a device 20.

In the device 20, the actual torque Mist_BKM of the internal combustion engine is added to the actual torque Mist_E1 of the electric machine, and the result fed to the comparator 22.

In the comparator 22, the acceptable torque M_zul_T which has been increased by a tolerance value is compared with the sum of the actual torques of the drive units, formed in a device 20 to determine whether the latter exceeds the acceptable torque M_zul_T in absolute value. This applies both to positive torques and negative torques; i.e., it is also checked whether the composite torque is greater than or equal to the minimum acceptable torque. If this is not the case, the comparator 22 outputs data for carrying out remedial measures, via a data line 23.

Figure 4:
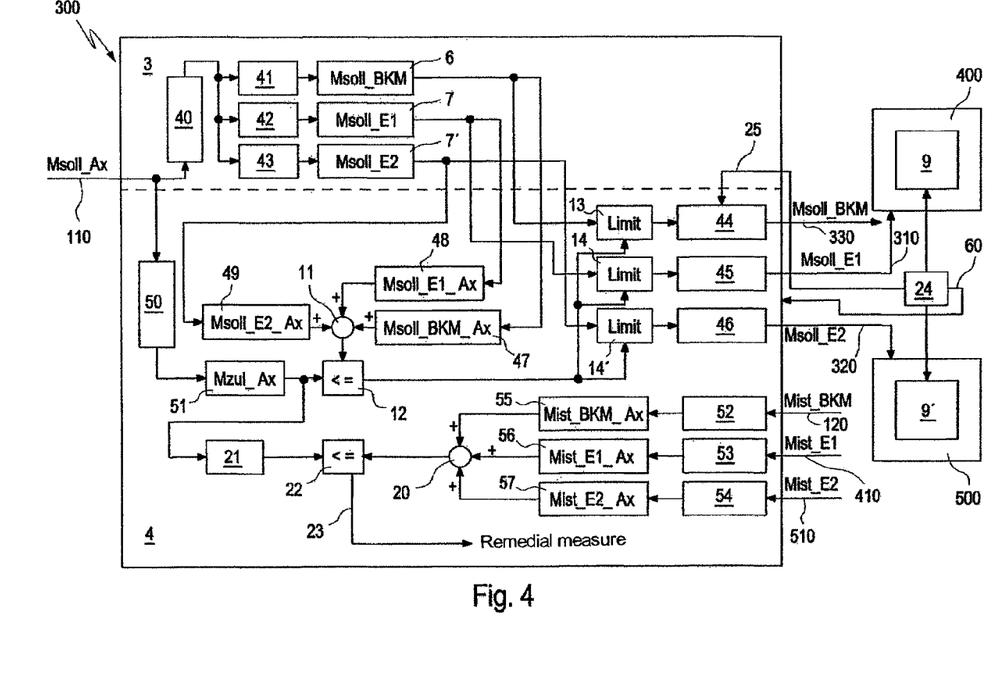
FIG. 4 is a schematic illustration of an embodiment of a hybrid control unit of an actuation system according to FIG. 2.

The actuation system illustrated in FIG. 1 has a supervision level 24. If the latter detects a fault of the control unit 100, it transmits a deactivation signal to the power output stage 9 which is assigned to the internal combustion engine, and to the data bus output 15, and deactivates the data bus output 15. In the embodiment illustrated in FIG. 1, the supervision level 24 is arranged within the function level 3 of the control unit 100. However, it can also be arranged separately, as illustrated in FIG. 4.

Figure 2:
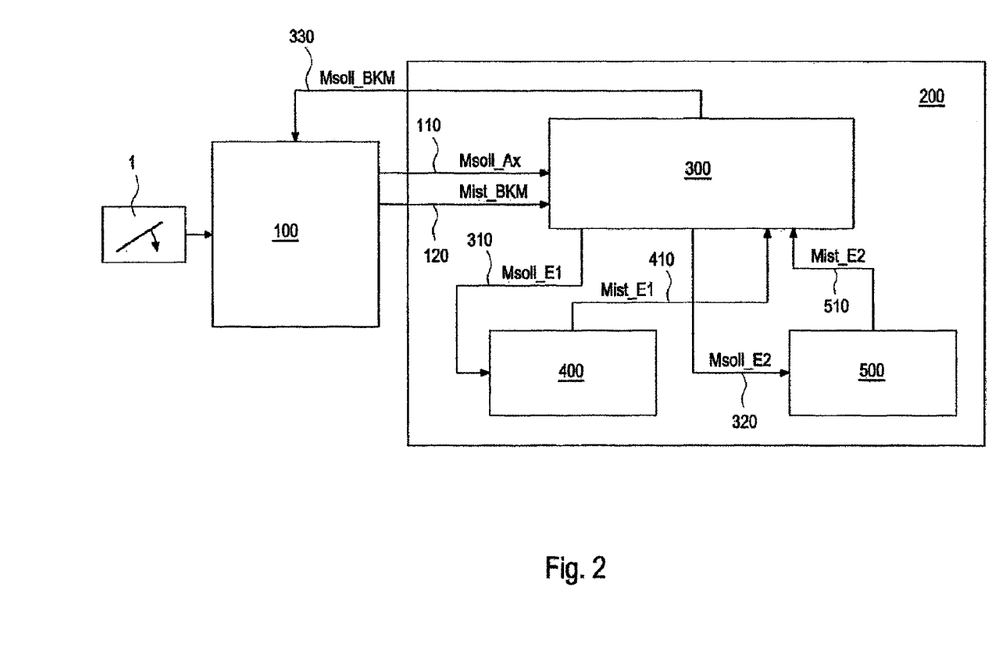
FIG. 2 is a schematic illustration of an embodiment of an actuation system according to the invention, having a plurality of control units.

The embodiment of an actuation system according to the invention which is illustrated in FIG. 2 shows, by way of example for other actuation systems, an actuation system which is capable of coordinating a plurality of different drive units.

An actuation system which contains a plurality of control units is illustrated in FIG. 2. In this context, a control unit 100 is provided for an internal combustion engine, a control 400 is provided for a first electric machine, and a control unit 500 is provided for a second electric machine. The cooperation between these control units is coordinated by a hybrid control unit 300. In the illustrated embodiment, the hybrid control unit 300, the control unit 400 for the first electric machine and the control unit 500 for the second electric machine are integrated into one structural unit 200.

The control unit 100 receives information from an accelerator pedal 1 about the position of the accelerator pedal, and forms therefrom a setpoint axial torque Msoll_Ax, which it forwards to the hybrid control unit 300 via a data connection 110.

The hybrid control unit 300 forms, from the setpoint axial torque Msoll_Ax, a setpoint torque Msoll_BKM of the internal combustion engine, a setpoint torque Msoll_E1 of the first electric machine, and a setpoint torque Msoll_E2 of the second electric machine.

The setpoint torque Msoll_BKM of the internal combustion engine is forwarded via a data connection 330 to the control unit 100 for the internal combustion engine. The control unit 100 controls the internal combustion engine in accordance with this setpoint torque Msoll_BKM. The control unit 100 for its part transmits the actual torque Mist_BKM of the internal combustion engine to the hybrid control unit 300 via a data connection 120.

The setpoint torque Msoll_E1 of the first electric machine is forwarded to the control unit 400 for the first electric machine via a data connection 310. The control unit 400 controls the first electric machine in accordance with this setpoint torque Msoll_E1. For its part, the control unit 400 for its part transmits the actual torque Mist_E1 of the first electric machine to the hybrid control unit 300 via a data connection 410.

The setpoint torque Msoll_E2 of the second electric machine is forwarded to the control unit 500 for the second electric machine via a data connection 320. The control unit 500 controls the second electric machine in accordance with this setpoint torque Msoll_E2. The control unit 500 for its part transmits the actual torque Mist_E2 of the second electric machine to the hybrid control unit 300 via a data connection 510.

Figure 3:
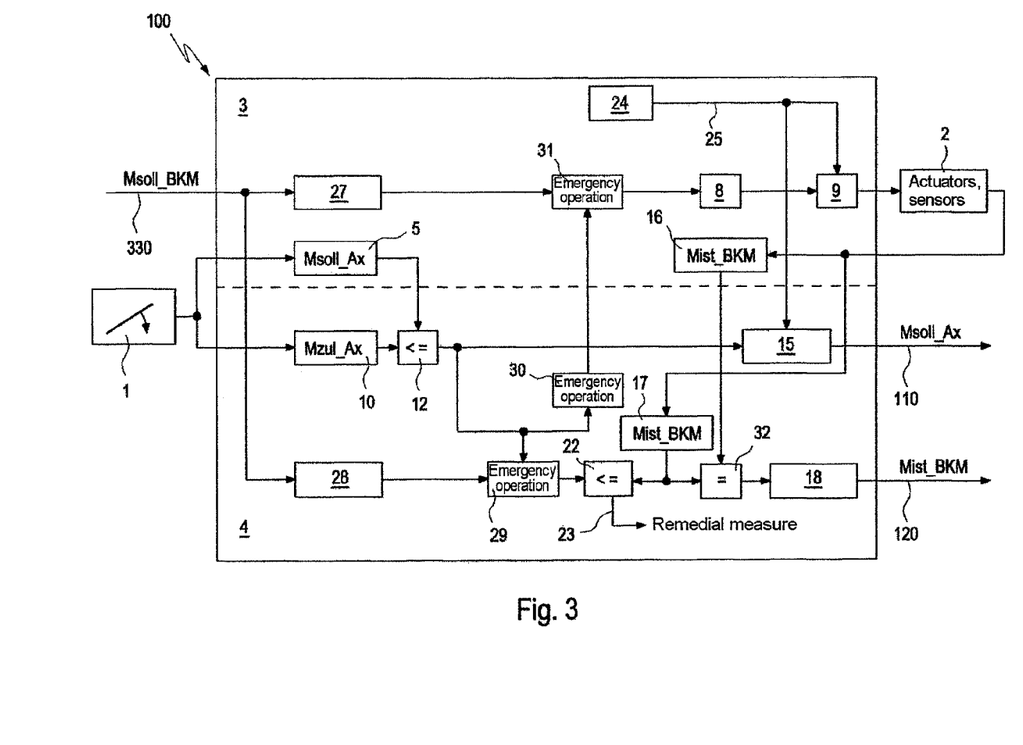
FIG. 3 is a schematic illustration of an embodiment of an actuation system according to the invention, having a control unit for an internal combustion engine.

FIG. 3 shows the internal structure of an embodiment of a control unit 100 of an internal combustion engine. This control unit 100 can be used, for example, in an actuation system for a hybrid drive, as is illustrated in FIG. 2. It has a function level 3 and a function monitoring level 4.

The control unit 100 receives information from an accelerator pedal 1 about the position of the accelerator pedal. A driver request torque M_Fahrer can be assigned to this position of the accelerator pedal. The accelerator pedal 1 forwards the information about the position of the accelerator pedal to the control unit 100, which forms therefrom a setpoint axial torque Msoll_Ax in a device 5 of the function level 3. The device 5 forwards the setpoint axial torque Msoll_Ax to a comparator 12.

Likewise, the function monitoring level 4 of the control unit 100 receives the information about the position of the accelerator pedal from the accelerator pedal 1. In a device 10, the function monitoring level 4 forms therefrom a maximum acceptable axial torque Mzul_Ax, and forwards it to the comparator 12.

In the comparator 12, the acceptable axial torque Mzul_Ax is compared with the setpoint axial torque Msoll_Ax formed in the device 5. In the process it is checked whether the setpoint axial torque Msoll_Ax is less than or equal to the maximum acceptable axial torque Mzul_Ax formed in device 10. The resulting information of the comparator 12 is forwarded to a data transmission device 15 and to emergency operating devices 29 and 30.

If the setpoint axial torque Msoll_Ax is less than or equal to the maximum acceptable axial torque Mzul_Ax formed in device 10, the setpoint axial torque Msoll_Ax is forwarded to a data transmission device 15 and to emergency operating devices 29 and 30.

The data transmission device 15 outputs the setpoint axial torque Msoll_Ax formed in the control unit 100, via a data line 110. In the embodiment illustrated in FIG. 2, the control unit 100 transmits the setpoint axial torque Msoll_Ax to a hybrid control unit 300 via this data line 110.

If the setpoint axial torque Msoll_Ax is greater than the maximum acceptable axial torque Mzul_Ax formed in device 10, the comparator 12 transmits this information to the data transmission device 15, which outputs it as a deactivation instruction via the data line 110.

If the setpoint axial torque Msoll-Ax is greater than the maximum acceptable axial torque Mzul_Ax, and the fault has not yet lasted for longer than a predefinable debouncing time, the setpoint axial torque Msoll-Ax is limited to the maximum acceptable axial torque Mzul_Ax and output to the emergency operating devices 29 and 30.

In one embodiment, existing signs of the torques are taken into account here. If, for example, the value of the setpoint axial torque Msoll_Ax=+100 and the value of the maximum acceptable axial torque Mzul_Ax=+80, then +80 is output; if, on the other hand, the value of the setpoint axial torque Msoll_Ax=−100 and the value of the maximum acceptable axial torque Mzul_Ax=+80, then 0 is output; and if the value of the setpoint axial torque Msoll_Ax=−100 and the value of the maximum acceptable axial torque Mzul_Ax=−80, then −80 is output.

If the setpoint axial torque Msoll_Ax is greater than a maximum acceptable axial torque Mzul_Ax for a period of time which is longer than the debouncing time, an invalid value is output to the emergency operating devices 29 and 30 and/or a reset of the control device 100 is carried out.

The emergency operating device 30 calculates, from the predefined values of the accelerator pedal 1 fed to it, an equivalent value for the setpoint torque Msoll_BKM which is referred to as an emergency operating torque Mnot in the text which follows.

For the conversion of the predefined values of the accelerator pedal 1 (driver request torque M_Fahrer, setpoint axial torque Msoll_Ax or the like) into a setpoint torque Msoll_BKM, the transmission ratios of all the active drive units must be known. Only with this information is it possible to convert the predefined accelerator pedal values to Msoll_BKM with a defined factor. For this purpose, the transmission is preferably connected to the electric machines by means of a defined gear speed. Alternatively, there may be provision for the transmission ratios to be sensed for each active drive unit.

A setpoint torque Msoll_BKM for the internal combustion engine is fed to the control unit 100 via a data line 330. In the embodiment, illustrated in FIG. 2, of an actuation system according to the invention, the setpoint torque Msoll_BKM of the internal combustion engine is formed in the hybrid control unit 300 from the setpoint axial torque Msoll_Ax which is output by the control unit 100.

The data line 330 transmits the setpoint torque Msoll_BKM for the internal combustion engine to a data transmission device 27 of the function level 3 of the control unit 100.

The setpoint torque Msoll_BKM, sensed by the data transmission device 27, of the internal combustion engine is forwarded to a torque conversion unit 8 via an emergency operating device 31. The torque conversion unit 8 converts the setpoint torque Msoll_BKM of the internal combustion engine into control instructions for a power output stage 9. The latter assumes the state which is predefined by the control instructions of the torque conversion unit 8 and in this way operates the actuators and/or sensors 2 assigned to it, in accordance with the control instructions predefined by the torque conversion unit 8.

The emergency operating device 31 is embodied in such a way that it detects whether the data transmission device 27 is operating without faults. (A typical fault here is an interruption in messages.) If the emergency operating device 31 detects a fault in the data transmission device 27, it outputs the emergency operating torque Mnot, fed to it by the emergency operating device 30, to the torque conversion unit 8, instead of the data from the data transmission device 27.

The emergency operating device 31 forwards the emergency operating torque Mnot to the torque conversion unit 8 and therefore to the power output stage 9 and to the actuators and/or sensors 2. The actuators and/or sensors 2 are operated in accordance with the emergency operating torque Mnot.

Information about the actual state of the internal combustion engine is fed back to the control unit 100 from the actuators and/or sensors 2 of the internal combustion engine. In the embodiment illustrated in FIG. 3, this information is fed to the device 16 of the function level 3 and to the device 17 of the function monitoring level 4. In the device 16, a current actual torque Mist_BKM of the internal combustion engine is formed from the information about the actual state of the internal combustion engine and fed to a comparator 32. In addition, the current actual torque Mist_BKM of the internal combustion engine is also formed in the device 17 from the information about the actual state of the internal combustion engine. The device 17 then feeds the actual torque Mist_BKM of the internal combustion engine to a comparator 22 and to the comparator 32.

The comparator 32 compares the actual torque Mist_BKM, formed in the device 16 of the function level 3, of the internal combustion engine with the actual torque Mist_BKM, formed in the device 17 of the function monitoring level 4, of the internal combustion engine. If the values formed in the two devices 16 and 17 are the same, the comparator outputs the actual torque Mist_BKM of the internal combustion engine. (In this case, the values are considered to be the same if they are deviate from one another by less than a predefinable tolerance range.) In this way, differences between the function level 3 and the function monitoring level 4 can be discovered and faults in the function level 3 or the function monitoring level 4 can be detected. Preferably, the actual torque value Mist_BKM which is the smaller (in absolute terms) of two actual torque values Mist_BKM (which are the same within a tolerance) is output as an output value.

The comparator 22 compares the actual torque Mist_BKM, fed to it, of the internal combustion engine with the setpoint torque Msoll_BKM for the internal combustion engine. For this purpose, the data line 330 transmits the setpoint torque Msoll_BKM for the internal combustion engine to a data transmission device 28 of the function monitoring level 4 of the control unit 100. This data transmission device 28 transmits the setpoint torque Msoll_BKM for the internal combustion engine to the comparator 22 via the emergency operating device 29. If the comparator 22 detects that the setpoint torque Msoll_BKM and the actual torque Mist_BKM of the internal combustion engine deviate from one another beyond a tolerance, it initiates remedial measures via a data line 23.

In the illustrated embodiment, an emergency operating device 29 is arranged between the data transmission device 28 and the comparator 22. It is embodied in such a way that it detects whether the data transmission device 28 is operating without faults. If it detects a fault in the data transmission device 28, the setpoint torque Msoll_BKM which is fed to the comparator 22 is replaced by an emergency operating torque Mnot which is calculated by the emergency operating device 29.

The remedial measure preferably consists in the axial setpoint torque Msoll_Ax, which is fed to the comparator 22 from the comparator 12 via the emergency operating device 29, being converted into an emergency torque Mnot, and it is fed to the internal combustion engine as an equivalent setpoint torque.

In one embodiment of the control unit 100, an additional device provided between the emergency operating device 29 and the comparator 22 provides the setpoint torque Msoll_BKM with a tolerance range, which may be positioned symmetrically or asymmetrically around the setpoint torque. A comparison value which is within the tolerance range is considered to be the same. The setpoint torque Msoll_BKM which is toleranced in the device is subsequently fed to the comparator 22.

The embodiment of an actuation system illustrated in FIG. 3 has a supervision level 24. If the supervision level 24 detects a fault in the inquiry/response communication of the control unit 100, it transmits a deactivation signal to the power output stage 9 and deactivates it.

In one embodiment, the power output stage of the control unit can be operated in accordance with an emergency operating torque if an emergency operating device detects a fault in the data transmission of a setpoint torque.

A fault in the data transmission is typically an interruption of the data transmission. However, other faults, for example in the accompanying checksum or a fault in the message counter (message counter corresponds to that of the preceding message or deviates by more than +1 from that of the preceding message), are possible. In the text which follows, a data bus input, a data bus output or a combination of both is referred to as a data transmission device. The associated data bus is typically embodied as a serial data bus or as a CAN data bus.

According to the invention, in the case of a fault the power output stage is operated in accordance with an emergency operating torque. The drive unit is therefore placed in a defined state. This ensures that the drive is in a nondamaging operating state, and this permits the drive unit to continue to be operated even when a fault occurs. As a result, the availability level of the drive unit is raised. This also leads to a raised availability level of the entire system which is assigned to the drive unit.

In one embodiment, a data transmission device for receiving a setpoint torque is provided, which data transmission device is embodied in such a way that it can act on an emergency operating device so that the outputting of an emergency operating torque can be triggered in the emergency operating device if the data transmission device does not receive a setpoint torque. The data transmission device is therefore capable of triggering the outputting of an emergency operating torque. If the data transmission device does not receive a setpoint torque, the absent setpoint torque is replaced by the emergency operating torque. This has the advantage that the actuation system can continue to be operated. This increases the availability level of the actuation system and of the drive unit.

The emergency operating torque is preferably formed from a setpoint axial torque which is itself formed from the signal of an accelerator pedal. For this purpose, a setpoint torque of the drive unit is calculated from the setpoint axial torque. This setpoint torque of the drive unit is output as an emergency operating torque.

In one embodiment, actuators or sensors of an internal combustion engine can be actuated in accordance with this emergency operating torque. As a result it is possible to prevent incorrect, unacceptable actuation of the drive unit without deactivating the actuation of the drive unit. This increases the availability level of the drive unit and of the entire actuation system.

In one embodiment, a setpoint axial torque or a setpoint torque of the drive unit can be limited to the value of an acceptable torque which is assigned to it and can be output by the first torque comparator to a data transmission device and/or the emergency operating device if the first torque comparator detects that the setpoint axial torque or setpoint torque of the drive unit exceeds the acceptable torque which is assigned to it. The torque is therefore limited to a noncritical and acceptable level.

In one embodiment, an invalid value or deactivation signal can be output from the first torque comparator to a data transmission device and/or emergency operating devices if a setpoint axial torque or a setpoint torque of the drive unit exceeds the acceptable torque assigned to it for longer than a predefinable debouncing time. By means of an invalid value or a deactivation signal it is possible to deactivate a drive unit, a control unit and/or other safety-related devices. This measure is desired in particular if the actuation system detects that it cannot eliminate a detected fault over a tolerable time period. This prevents a fault of a device of the actuation system affecting other devices.

In one embodiment, a second torque comparator is provided, which can trigger a remedial measure it detects that an actual torque, fed to it, of the drive unit exceeds a setpoint torque, fed to it via an emergency operating device, of the drive unit beyond a predefinable tolerance range. In this way it is possible to detect an unacceptably high actual torque. Initiating a remedial measure allows damage to be avoided and a reliable operating state of the drive unit to be ensured. For example, a remedial measure is that torque can no longer be produced above a rotational speed (implemented in an internal combustion engine by limiting the injection quantity). This can prevent an unacceptably high actual torque.

In one embodiment, an emergency operating torque can be fed as a setpoint torque to the second torque comparator if the emergency operating device detects a fault in the data transmission of the setpoint torque. The second comparator can therefore then also carry out checking of the actual torque if the setpoint torque has not been transmitted or has been transmitted incorrectly. In the event of an interruption in messages of the setpoint torque which is transmitted by the data transmission device, an emergency operating torque (result of the first comparator converted to the crankshaft torque) which is formed from the output data of the first comparator by means of the emergency operating device is predefined and the second comparator is supplied with this emergency operating torque instead of with the incorrect/missing setpoint torque of the data transmission device. In this way, monitoring of the setpoint torque with respect to the actual torque is still active even in the case of emergency operation. This is very important in order to detect incorrect activation of the drive unit and, if appropriate, deactivate it.

In one embodiment, the control unit is assigned to an internal combustion engine, wherein, in the control unit, an incoming driver request torque can be processed and an axial setpoint torque which can be formed therefrom can be forwarded to a hybrid control unit. It is therefore possible to form a distributed system in which the control of the actuators occurs locally with respect to the actuators (because for example the power electronics including the control means are arranged directly on the machine). In this case, no cables are necessary for the machine, but instead it is also possible to use power rail arrangements. The power rail arrangements are rigid conductor tracks which are cost effective to manufacture and robust against heat, moisture, dirt and mechanical loading.

Converting the driver request torque into an axial setpoint torque has the advantage that this axial setpoint torque is independent of the type and scope of the drive units which are available and the transmission ratios of the drive train. It is therefore also possible to coordinate different internal combustion engines by means of a hybrid control unit.

If the conversion of the driver request torque into an axial setpoint torque occurs in the control unit in an internal combustion engine, the axial setpoint torque is also available when only this internal combustion engine is operating and can also be used when a hybrid control unit is absent or fails.

Forwarding to a hybrid control unit makes it possible to coordinate a plurality of drive units outside the control unit of the internal combustion engine and therefore relieve the control unit of the internal combustion engine of these tasks.

In one embodiment, in the hybrid control unit individual setpoint torques for drive units that are to be actuated can be formed from the axial setpoint torque, and such individual setpoint torques can be forwarded from the hybrid control unit to the control units of the drive units that are to be actuated. Central coordination of all the drive units that are to be actuated is therefore possible.

In one embodiment, the control units of the drive units which are to be actuated are connected to the hybrid control unit in such a way that the actual torques of the drive units can be forwarded from the control units of the drive units to the hybrid control unit via a data transmission device. The hybrid control unit is therefore able to monitor the satisfactory implementation of the predefined values and, if appropriate, intervene in a controlling fashion.

Further details and embodiments of an actuation system can be found in German patent document DE 102 005 025 994 which is still unpublished and in which an actuation system for an electric machine and a method for operating an electric machine with an electric actuation system are described. These are therefore not described in more detail here.

FIG. 4 shows a hybrid control unit 300, a supervision level 24 of the hybrid control unit 300, a control device 400 for a first electric machine and a control device 500 for a second electric machine. These components may be part of an actuation system, as illustrated in FIG. 2. In this context, they can be integrated into one structural unit 200.

The design of the hybrid control unit 300 in FIG. 4 corresponds largely to the design of the control unit 100 in FIG. 1. The hybrid control unit 300, which also has a function level 3 and a function monitoring level 4, receives a setpoint axial torque Msoll_Ax via a data connection 110. As illustrated in FIG. 2, in this context the setpoint axial torque Msoll_Ax is typically formed in a control unit 100 of an internal combustion engine. The data connection 110 feeds the setpoint axial torque Msoll_Ax to a data bus input 40 of the function level 3 and to a data bus input 50 of the function monitoring level 4.

The function level 3 of the control unit 300 is used to process a setpoint predefined value which is input as a setpoint axial torque Msoll_Ax, and to forward a resulting control instruction to a power output stage 9, 9'. In the function level 3, an incoming setpoint predefined value can be split into a plurality of setpoint torques Msoll_BKM, Msoll_E1, Msoll_E2 in such a way that each available drive can be assigned a setpoint torque Msoll_BKM, Msoll_E1 or Msoll_E2. For this purpose, the data bus input 40 of the function level 3 forwards the setpoint axial torque Msoll_Ax to three converters 41, 42 and 43, which forward it to three devices 6, 7 and 7'.

In the device 6, a setpoint torque Msoll_BKM of the internal combustion engine is formed from the setpoint axial torque Msoll_Ax converted in the converter 41. The setpoint torque Msoll_BKM, formed in the device 6, of the internal combustion engine is, if appropriate after limitation by a limiter 13, forwarded to a data bus output 44 and output by the latter to the control unit 100 of the internal combustion engine via a data line 330.

In the device 7, a setpoint torque Msoll_E1 of a first electric machine is formed from the setpoint axial torque Msoll_Ax converted in the converter 42. The setpoint torque Msoll_E1, formed in the device 7, of the first electric machine is, if appropriate after limitation by a limiter 14, forwarded to a data bus output 45 and output by the latter to a control unit 400 of the first electric machine via a data line 310.

In the device 7', a setpoint torque Msoll_E2 of the second electric machine is formed from the setpoint axial torque Msoll_Ax which is converted in the converter 43. The setpoint torque Msoll_E2, formed in device 7', of a second electric machine is, if appropriate after limitation by a limiter 14', forwarded to a data bus output 46 and output by the latter to a control unit 500 of a second electric machine via a data line 320.

In the embodiment illustrated in FIG. 4, the limiters 13, 14, 14' and the data outputs 44, 45, 46 are arranged in the function monitoring level 4 of the hybrid control unit 300.

The data connection 110 also feeds the setpoint axial torque Msoll_Ax to the data bus input 50 of the function monitoring level 4. The data but input 50 of the function monitoring level 4 transmits the setpoint axial torque Msoll_Ax to a device 51 which forms a maximum acceptable axial torque Mzul_Ax from the setpoint axial torque Msoll_Ax. The maximum acceptable axial torque Mzul_Ax which is formed in the device 51 is fed to a comparator 12.

In the comparator 12, the maximum acceptable axial torque Mzul_Ax is compared with a sum, formed in a device 11, of the setpoint axial torques of all the drive units. For this purpose, three converters 47, 48 and 49 are arranged in the function monitoring level 4.

The device 6 which is arranged in the function level 3 feeds to the converter 47 the setpoint torque Msoll_BKM, formed by said device 6, of the internal combustion engine. The converter 47 converts the setpoint torque Msoll_BKM into a setpoint axial torque Msoll_BKM_Ax of the internal combustion engine.

The device 7 which is arranged in the function level 3 feeds, to the converter 48, the setpoint torque Msoll_E1, formed by said device 7, of the first electric machine. The converter 48 converts the setpoint torque Msoll_E1 into a setpoint axial torque Msoll_E1 Ax of the first electric machine.

The device 7' which is arranged in the function level 3 feeds, to the converter 49, the setpoint torque Msoll_E1, formed by said device 7', of the second electric machine. The converter 49 converts the setpoint torque Msoll_E2 into a setpoint axial torque Msoll_E2_Ax of the second electric machine.

In a device 11, the setpoint axial torque Msoll_BKM_Ax of the internal combustion engine is added to the setpoint axial torque Msoll_E1_Ax of the first electric machine, and to the setpoint axial torque Msoll_E2_Ax of the second electric machine.

The result of this addition is fed to the comparator 12, which checks whether the sum of the setpoint torques formed in device 11 is less than or equal to the maximum acceptable axial torque Mzul_Ax formed in the device 51. If not, the comparator 12 forwards this information to limiters 13, 14 and 14', which are arranged in the function monitoring level 4. If the sum of the setpoint torques which is formed in device 11 is less than or equal to the maximum acceptable axial torque Mzul_Ax formed in device 10, the limiters 13, 14 and 14' forward the setpoint torques Msoll_BKM, Msoll_E1, Msoll_E2 formed in the devices 6, 7 and 7' to one of the data bus outputs 44, 45, 46, without modification.

If the sum of setpoint torques formed in device 11 is not less than or equal to the maximum acceptable axial torque Mzul_Ax formed in device 10, the limiters 13, 14 and 14' respectively limit the setpoint torque Msoll_BKM, Msoll_E1, Msoll_E2, formed in the devices 6, 7 and 7', to an acceptable degree before the setpoint torque Msoll_BKM, Msoll_E1, Msoll_E2 is fed to one of the data bus outputs 44, 45, 46.

The device 51 also forwards the maximum acceptable axial torque Mzul_Ax to a device 21. In the device 21, the acceptable torque Mzul is increased by a tolerance T. This acceptable torque M_zul_T which is increased by a tolerance T is then fed to a comparator 22. In the comparator 22, the acceptable torque M_zul_T, which has been increased by a tolerance T, is compared with the sum of the actual axial torques of the drive units which is formed in a device 20. In order to acquire this sum, the actual torque Mist_BKM of the internal combustion engine is fed to the hybrid control unit 300 via the data line 120, the actual torque Mist_E1 of the first electric machine is fed via a data line 410, and the actual torque Mist_E2 of the second electric machine is fed via a data line 510.

The data line 120 feeds the actual torque Mist_BKM of the internal combustion engine for this purpose to a data bus input 52 of the function monitoring level 4. Correspondingly, the data line 410 feeds the actual torque Mist_E1 of the first electric machine to a data bus input 53, and the data line 510 feeds the actual torque Mist_E2 of the second electric machine to a data bus input 54 of the function monitoring level 4.

The actual torques are forwarded from the data bus inputs 52, 53 and 54 to converters 55, 56 and 57, which convert them into actual axial torques and feed them to an adder 20. The latter adds the actual axial torque Mist_BKM_Ax, which has been fed to it, of the internal combustion engine to the actual axial torques Mist_E1_Ax and Mist_E2_Ax, which have been fed to it, of the first and second electric machines. The result of this addition is fed to the comparator 22, which checks whether the sum formed in device 20 exceeds the toleranced maximum acceptable torque M_zul_T formed in device 21. If so, the comparator 22 outputs data for carrying out remedial measures, via a data line 23.

Of course, in alternative embodiments it is also possible to provide further drives. In this case, the illustrated design of the actuation system is merely correspondingly supplemented.

A supervision level 24 is assigned to the hybrid control unit 300. In the embodiment of the actuation system which is illustrated in FIG. 4, the supervision level 24 is arranged separately from the hybrid control unit 300. If the supervision level 24 detects a fault of the hybrid control unit 300, it transmits, via a deactivation path 25, a deactivation signal to the data bus output 44, assigned to the internal combustion engine, of the hybrid control unit 300 and deactivates it. In the embodiment illustrated in FIG. 4, further deactivation paths proceeding from the supervision level 24 are provided, via which deactivation paths a deactivation signal for deactivating the first electric machine can also be transmitted to the power output stage 9 of the control unit 400 of the first electric machine, and a deactivation signal for deactivating the second electric machine can also be transmitted to the power output stage 9' of the control unit 500 of the second electric machine.

Furthermore, the supervision level 24 has a reset data line 60 which connects it to the hybrid control unit 300. Via this data line 60, the hybrid control unit 300 can be reset into its basic state in accordance with the supervision level 24.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An actuation system for a drive unit of a motor vehicle, comprising:
    a control unit which is assigned to the drive unit and has a function level and a function monitoring level;
    a power output stage for actuating the drive unit or actuators or sensors which are assigned to the drive unit; wherein,
    a data transmission device for outputting data to a data bus is arranged in the function monitoring level; and
    the data transmission device is configured to output a drive setpoint torque to at least one of the drive unit, actuators or sensors which are assigned to it, and a power output stage of a separate, second drive unit,
    the drive setpoint torque is a torque value corresponding to a driver requested torque.

2. The actuation system as claimed in claim 1, wherein,
    a setpoint value can be fed to the control unit, and can be split in the function level of the control unit into a plurality of drive setpoint torques; and
    each drive setpoint torque is assigned to a separate drive unit.

3. The actuation system as claimed in claim 1, wherein:
    the control unit has a torque limiter that is configured to limit the drive setpoint torque that is fed to it, if a comparator detects that the sum of the drive setpoint torques exceeds a maximum permissible torque.

4. The actuation system as claimed in claim 1, wherein:
    the data transmission device of the function monitoring level of the control unit which is assigned to a drive unit can output a setpoint axle torque to a hybrid control unit.

5. The actuation system as claimed in claim 1, wherein:
    an permissible torque can be formed in the function monitoring level of the control unit and increased by a tolerance T to form a toleranced permissible torque; and
    the toleranced permissible torque can be compared in a second torque comparator with a sum formed by adding the respective actual torques or the actual axle torques of the separate drive units; and
    a remedial measure is triggered by the second torque comparator if said sum exceeds the toleranced permissible level.

6. The actuation system as claimed in claim 1, wherein the data transmission device is configured to output a drive setpoint torque to each of the drive unit, actuators or sensors which are assigned to it, and a power output stage of a separate, second drive unit.

7. An actuation system for a drive unit of a motor vehicle, comprising:
    a control unit which is assigned to the drive unit and has a function level and a function monitoring level;
    a power output stage for actuating the drive unit or actuators or sensors which are assigned to the drive unit; wherein,
    a data transmission device for outputting data to a data bus is arranged in the function monitoring level;
    the data transmission device can output a drive setpoint torque to the drive unit, to actuators or sensors which are assigned to it or to a power output stage of a separate, second drive unit, the data transmission device of the function monitoring level of the control unit which is assigned to a drive unit can output a setpoint axle torque to a hybrid control unit;

drive setpoint torques for the separate drive units which are to be actuated can be formed in the hybrid control unit from the axle setpoint torque; and said drive setpoint torques can be forwarded from the hybrid control unit to the control units of the drive units which are to be actuated.

8. The actuation system as claimed in claim 7, wherein:
the control units of the drive units which are to be actuated are connected to the hybrid control unit in such that the respective actual torques of the separate drive units can be forwarded from the control units of the drive units to the hybrid control unit.

9. The actuation system as claimed in claim 8, wherein:
a supervision unit assigned to the hybrid control unit supervises one of the function level and the function monitoring level of the hybrid control unit;

the supervision unit is directly connected to the data transmission device via a deactivation path; and the data transmission device can be deactivated if the supervision unit detects a fault of the hybrid control unit.

10. The actuation system as claimed in claim 9, wherein:
the supervision unit is directly connected to a power output stage of one of the control units via a deactivation path; and the power output stage can be deactivated if the supervision unit detects a fault of the control unit.

11. The actuation system as claimed in claim 9, wherein:
the supervision unit is directly connected to the hybrid control unit via a reset path; and the hybrid control unit can be reset into a standard state if the supervision unit detects a fault of the hybrid control unit.

* * * * *